United States Patent
Schwarzkopf et al.

(10) Patent No.: US 6,872,068 B2
(45) Date of Patent: Mar. 29, 2005

(54) MOUNTING SLEEVE FOR NOZZLE HEATER

(75) Inventors: Eugen Schwarzkopf, Ludenscheid (DE); Hans Wegener, Altena (DE)

(73) Assignee: Hotset Heizpatronen U. Zubehor GmbH, Ludenscheid (DE)

( * ) Notice: Subject to any disclaimer, the term of this patent is extended or adjusted under 35 U.S.C. 154(b) by 114 days.

(21) Appl. No.: 10/348,919

(22) Filed: Jan. 22, 2003

(65) Prior Publication Data

US 2003/0143302 A1 Jul. 31, 2003

(30) Foreign Application Priority Data

Jan. 25, 2002 (DE) ..................................... 202 01 067 U

(51) Int. Cl.⁷ ............................................. B29C 45/20
(52) U.S. Cl. .................................. 425/549; 264/328.15
(58) Field of Search ...................... 425/549; 264/328.15

(56) References Cited

U.S. PATENT DOCUMENTS

| | | | | |
|---|---|---|---|---|
| 4,635,851 A | * | 1/1987 | Zecman | ...................... 425/549 |
| 5,360,333 A | * | 11/1994 | Schmidt | ...................... 425/549 |
| 5,411,392 A | * | 5/1995 | Von Buren | .................. 425/549 |
| 5,558,888 A | * | 9/1996 | Beck | ........................... 425/549 |
| 6,302,680 B1 | * | 10/2001 | Gellert et al. | ............... 425/549 |

FOREIGN PATENT DOCUMENTS

DE        37 36 612        5/1989

* cited by examiner

*Primary Examiner*—Tim Heitbrink
(74) *Attorney, Agent, or Firm*—Herbert Dubno; Andrew Wilford

(57) ABSTRACT

A mounting sleeve fits around a nozzle extending along an axis and a heating coil wrapped around the nozzle and having an outer surface generally centered on the axis. The a mounting sleeve has a sleeve-shaped bimetal body having inner and outer layers and a pair of angularly juxtaposed edges. The body is shaped and dimensioned to fit around the coil with the inner layer engaging the coil outer surface. The inner layer has a smaller coefficient of thermal expansion than the outer layer so that when heated the body contracts radially inward. Interengaging formations at the edges generally prevent radial outward expansion of the body when interengaged.

11 Claims, 3 Drawing Sheets

MOUNTING SLEEVE FOR NOZZLE HEATER

FIELD OF THE INVENTION

The present invention relates to an injection-molding nozzle heater. More particularly this invention concerns a sleeve for clamping such a heater to the nozzle.

BACKGROUND OF THE INVENTION

A standard extruder nozzle is often equipped with its own heater so that it can be maintained at a precise temperature that is set to ensure that the resin being pumped through it remains fluent. The nozzle is an elongated metallic part that normally is centered on a central longitudinal axis. The heater is annularly tubular and fit closely around the nozzle.

To this end the heater is typically formed as a coil having a multiplicity of turns and a pair of ends projecting tangentially from the coil. A resistance-heating wire extends through the turns to heat them.

In order to maximize heat transfer from the tubularly annular heater to the outer surface of the nozzle, the heater is clamped tightly on the nozzle. This can be done as described in German patent 3,736,612 by a mounting sleeve that fits tightly around the heater and that is provided with a wedge arrangement that projects radially and that is traversed by a longitudinal screw that can be tightened to pull the sleeve tightly around the heater and compress it radially inward on the nozzle.

Such an arrangement has the considerable disadvantage that the mounting sleeve itself, at least the radially projecting clamping part, is fairly bulky. It must be accommodated in the extruder by special orientation of the nozzles or formation of the extruder. What is more it normally creates a location where the thermal characteristics are different from the rest of the nozzle, forming a hot or cold spot, because the rest of the mounting sleeve is either exposed or in contact with the extruder. Finally mounting this sleeve requires the use of tools, and taking it off not only also requires tools, but is frequently very difficult because it has frozen in place on the heater coil.

OBJECTS OF THE INVENTION

It is therefore an object of the present invention to provide an improved mounting system for a nozzle sleeve heater.

Another object is the provision of such an improved mounting system for a nozzle sleeve heater which overcomes the above-given disadvantages, that is which is of very compact construction.

A further object is such a mounting system which is easy to install over a coil and also easy to remove therefrom, preferably without tools.

SUMMARY OF THE INVENTION

A mounting sleeve in accordance with the invention fits around a nozzle extending along an axis and a heating coil wrapped around the nozzle and having an outer surface generally centered on the axis. The mounting sleeve has a sleeve-shaped bimetal body having inner and outer layers and a pair of angularly juxtaposed edges. The body is shaped and dimensioned to fit around the coil with the inner layer engaging the coil outer surface. The inner layer has a smaller coefficient of thermal expansion than the outer layer so that when heated the body contracts radially inward. Interengaging formations at the edges generally prevent radial outward expansion of the body when interengaged.

Such a mounting sleeve has the considerable advantage that it will tighten itself on the coil when heated so that, when the nozzle is in operation, the coil will be clamped tightly to it. No tools or steps need be taken to ensure such tightening; it is automatic. When the nozzle cools off, the mounting sleeve will relax, making removing it and, if necessary, the heater fairly easy.

In addition the mounting sleeve according to the invention is of very reduced radial dimension. In fact, when the body is of generally uniform thickness, there will be nothing projecting past its outer surface which is normally cylindrical, like the sleeve, the coil, and the outer surface of the nozzle. Thus nozzles can be fitted with heater coils and mounting sleeves in very close quarters and the thermal characteristics over the entire surface of the mounting sleeve will be roughly the same.

According to another feature of the invention the edges are angularly juxtaposed with each other and the formations include tabs projecting angularly from one of the edges and complementary seats formed on the other of the edges and in which the tabs are engageable. The tabs and seats can be T- or J-shaped.

Alternately in accordance with the invention the edges overlap, one lying radially on the other, and the formations include radially throughgoing holes formed on one of the edges and radially projecting tabs formed on the other of the edges and fitted to the holes. These tabs are angled inward and away from the other edge. Thus they can be easily snapped into position. In this arrangement excellent stability of the mounted sleeve is obtained when the tabs and holes are of complementary generally square shape. Even though there is a double thickness of the sleeve body at the edge, this thickness is still much less than the clamping systems of the prior art.

The sleeve extends over an entire length of the coil and the body is about 1 mm thick and between 30 mm and 250 mm long. The body is generally cylindrical and has an inside diameter of 10 mm to 28 mm.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
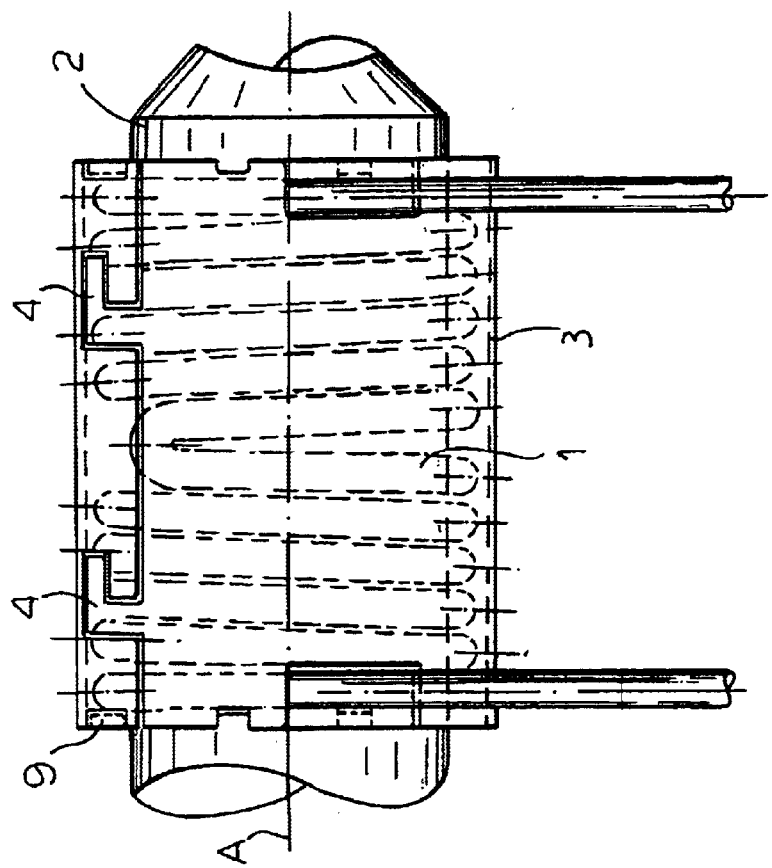
FIG. 1 is a side view of a nozzle, heater, and mounting sleeve according to the invention.
Figure 2:
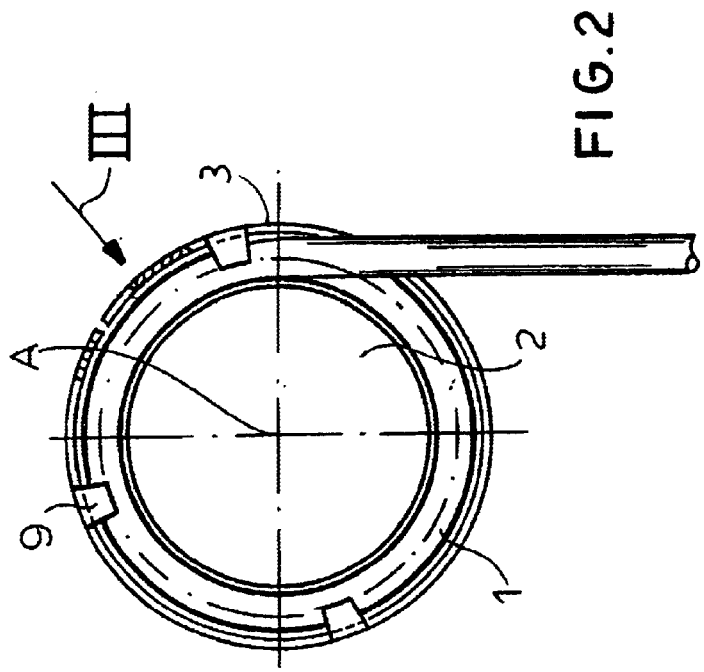
FIG. 2 is a partly sectional end view of the assembly of FIG. 1.
Figure 3:
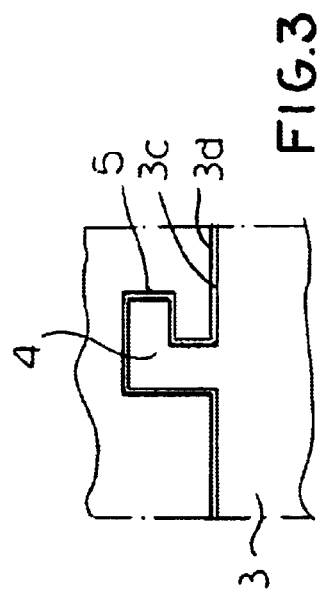
FIG. 3 is a large-scale view of the detail indicated at III in FIG. 2.
Figure 4:
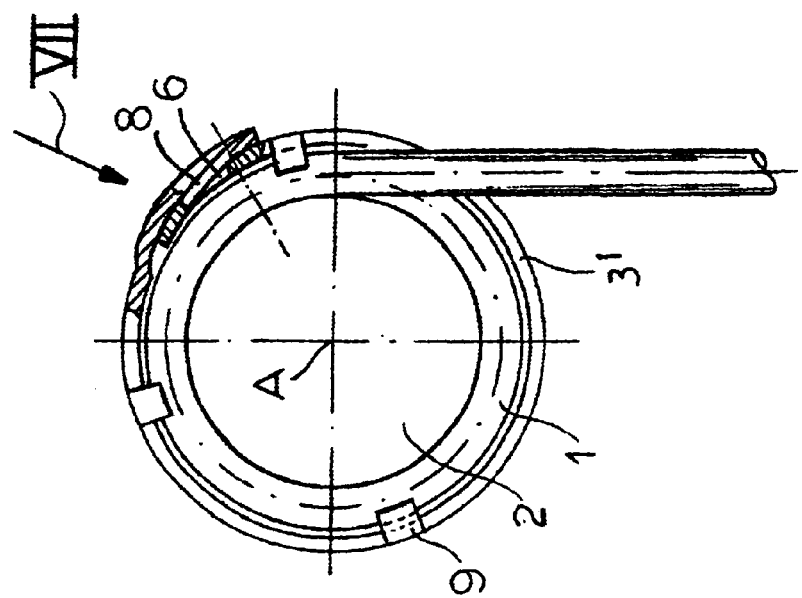
FIGS. 4 and 5 are views like FIGS. 1 and 2 of the another mounting sleeve in accordance with the invention.
Figure 5:
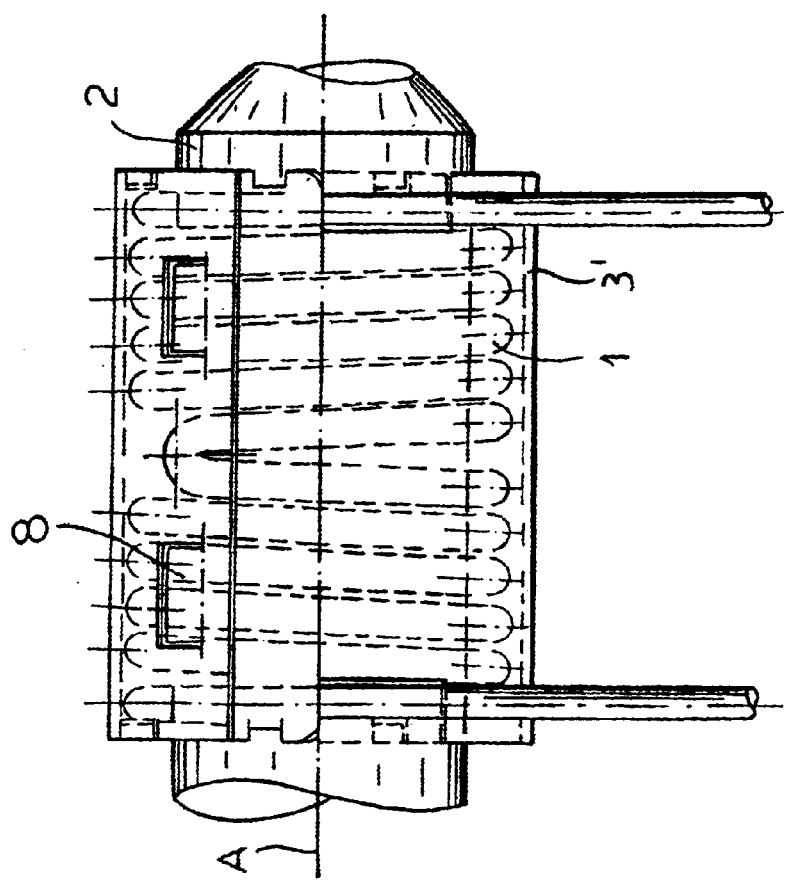

As seen in FIGS. 1 through 3, a standard extruder nozzle 2 is centered on and extends along an axis A and has a cylindrical outer surface. It is surrounded by a so-called sleeve heater 1 having a multiplicity of turns and a pair of tangentially projecting ends. The heater 1 has basically cylindrical outer and inner surfaces and is normally of an inside diameter slightly larger than an outside diameter of the nozzle 2. The heater 1 can be compressed somewhat radially.

Figure 6:
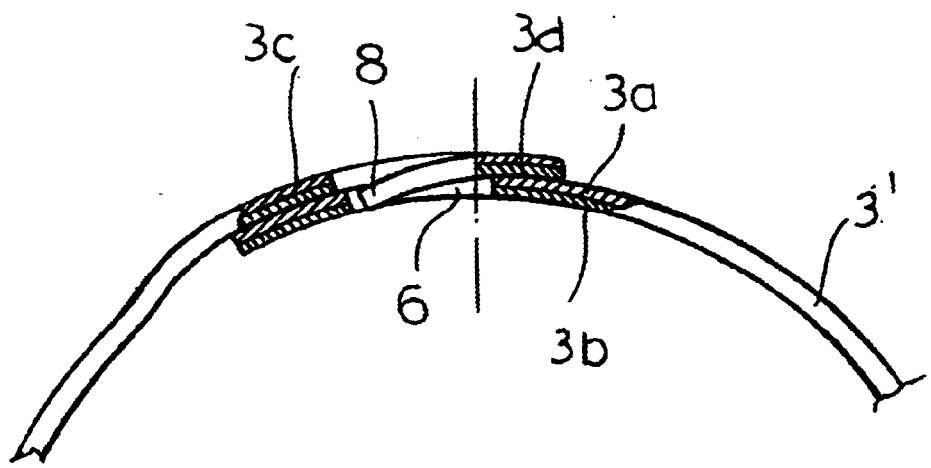
FIG. 6 is a large-scale view of a detail of FIG. 2.
Figure 7:
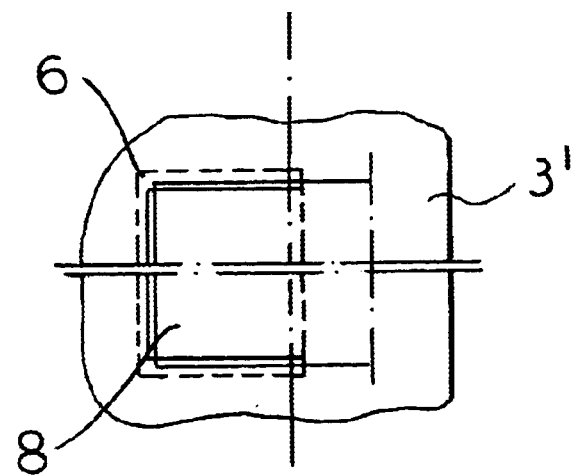
FIG. 7 is a large-scale view of the detail indicated at VII in FIG. 5.

In accordance with the invention the heater 1 is secured in place by a mounting sleeve 3 formed of two layers 3a and 3b (FIG. 6 only), the outside layer 3a having a larger thermal coefficient than the inside layer 3b so that when this sleeve 3 is heated, it will contract radially, that is decrease in diameter.

The sleeve 3 is held in place in that it is split, having a pair of longitudinally extending and angularly confronting edges 3c and 3d. Tabs 9 at the ends project radially inward. Two J-shaped extensions 4 from the edge 3c fit into complementary seats or cutouts 5 cut in the sleeve 3 and opening at the edge 3c. At room temperature thus the sleeve 3 can be fitted over the heater 1 with the tabs 9 past the ends of the coil 1. Then the tabs 4 are fitted into the seats 5. In this condition the entire radial thickness of the sleeve 3 is basically reduced to the sum of the thicknesses of the layers 3a and 3b; nothing projects past its cylindrical outer surface. Thus the sleeve 3 can be fitted over a nozzle 2 in very close quarters.

When the nozzle 2 is subsequently heated the entire sleeve 3 contracts radially and the coil 1 is pressed radially inward against the nozzle 2. At room temperature, however, the sleeve 3 is loose so uninstalling the coil 1 and sleeve 3 is relatively easy.

In the arrangement of FIGS. 4 through 7 the two edges 3c and 3d of the sleeve 3' overlap and the sleeve 3' is formed offset from the edge 3c with a pair of axially spaced and radially throughgoing square holes or seats 6. Offset from the other edge 3d are complementary inwardly projecting tabs 8 that, when the sleeve 3' is fitted to a heater 1, can fit into the holes 6. Thus this sleeve 3' has a radial thickness equal to twice the thickness of the two layers 3a and 3b, but still is quite slim and can be accommodated in fairly restricted spaces.

We claim:

1. In combination with an injection nozzle extending along an axis and a heating coil wrapped around the nozzle and having an outer surface generally centered on the axis, a mounting sleeve comprising:

a sleeve-shaped bimetal body having inner and outer layers and a pair of angularly juxtaposed edges, the body being shaped and dimensioned to fit around the coil with the inner layer engaging the coil outer surface, the inner layer having a smaller coefficient of thermal expansion than the outer layer, whereby when heated the body contracts radially inward; and interengaging formations at the edges generally preventing radial outward expansion of the body when interengaged.

2. The combination defined in claim 1 wherein the body is of generally uniform thickness.

3. The combination defined in claim 1 wherein the edges are angularly juxtaposed with each other and the formations include tabs projecting angularly from one of the edges and complementary seats formed on the other of the edges and in which the tabs are engageable.

4. The combination defined in claim 3 wherein the tabs and seats are J-shaped.

5. The combination defined in claim 1 wherein the edges overlap, the formations including radially throughgoing holes formed on one of the edges and radially projecting tabs formed on the other of the edges and fitted to the holes.

6. The combination defined in claim 5 wherein the tabs are angled inward and away from the other edge.

7. The combination defined in claim 6 wherein the tabs and holes are of complementary generally square shape.

8. The combination defined in claim 1 wherein the sleeve extends over an entire length of the coil.

9. The combination defined in claim 1 wherein the body is about 1 mm thick.

10. The combination defined in claim 1 wherein the body is between 30 mm and 250 mm long.

11. The combination defined in claim wherein the body is generally cylindrical and has an inside diameter of 10 mm to 28 mm.

* * * * *